United States Patent [19]

Wilson

[11] 4,151,829
[45] May 1, 1979

[54] SOLAR ENERGY COLLECTOR

[75] Inventor: Wilfred W. Wilson, Toronto, Canada

[73] Assignee: Suntron Energy Systems Ltd., Markham, Canada

[21] Appl. No.: 835,047

[22] Filed: Sep. 21, 1977

[51] Int. Cl.² ............................................. F24J 3/02
[52] U.S. Cl. .................................... 126/271; 126/270
[58] Field of Search .............. 126/270, 271; 237/1 A; 165/49, 171, 172

[56] References Cited

U.S. PATENT DOCUMENTS

| 3,587,559 | 6/1971 | Nonaka | 126/271 |
|---|---|---|---|
| 3,951,128 | 4/1976 | Schoenfelder | 126/271 |
| 3,964,464 | 6/1976 | Hockman | 126/271 |
| 4,010,080 | 3/1977 | Tsay et al. | 126/271 |
| 4,015,586 | 4/1977 | Vroom et al. | 126/271 |
| 4,083,358 | 4/1978 | Scott | 126/271 |

Primary Examiner—Kenneth W. Sprague
Assistant Examiner—James C. Yeung

[57] ABSTRACT

A solar energy collector includes a housing having a back reflective wall and a transparent forward wall. The chamber between the walls is sealed against air-interchange with the surrounding air. A number of parallel blackened pipes are interconnected to define a fluid path from an inlet to an outlet, and the pipes are spaced so that there exists a plurality of unhindered light paths through the area of pipes from the transparent wall to the reflective surface, so that a substantial portion of any light passing along the unhindered paths and reflecting from the reflective surface will strike the exteriors of the pipes.

6 Claims, 5 Drawing Figures

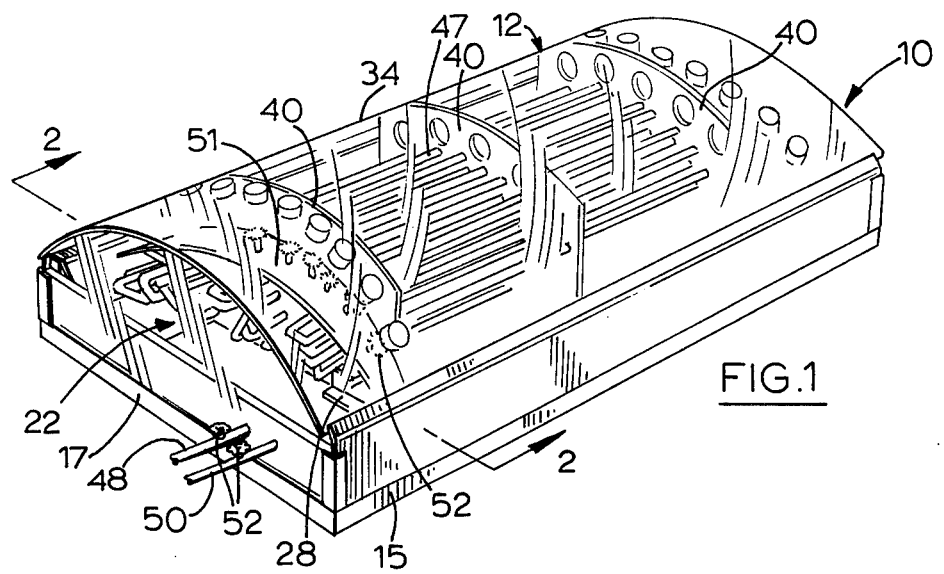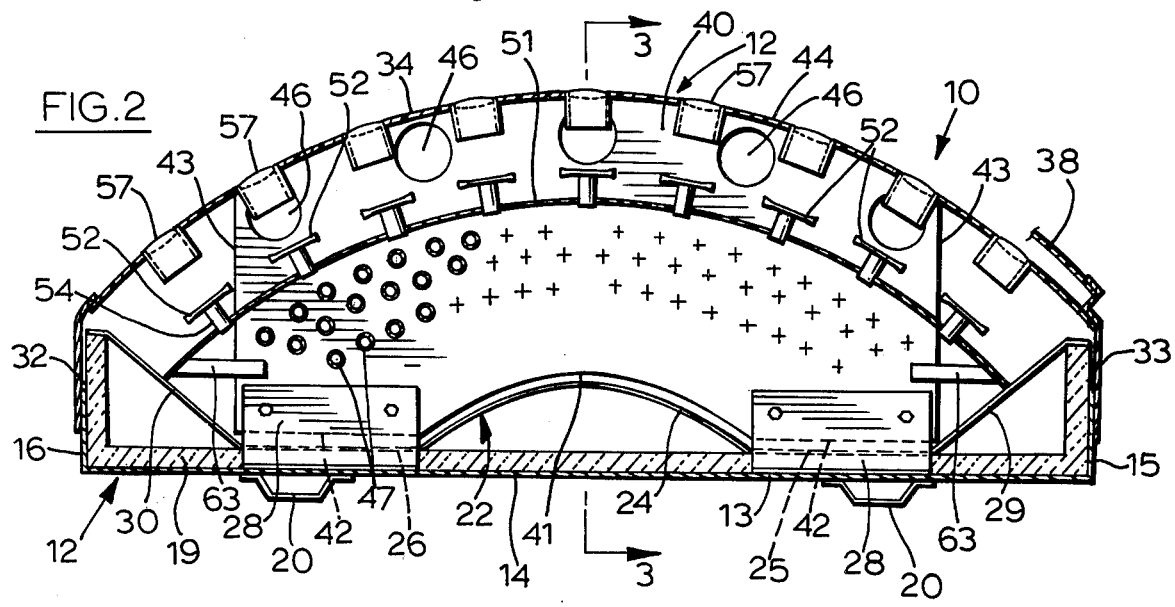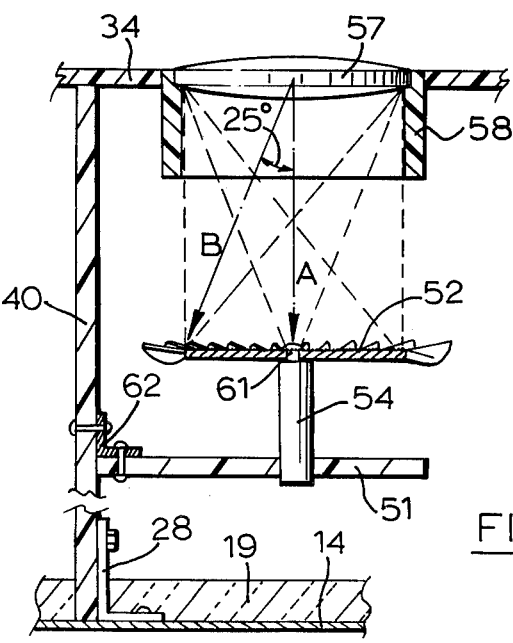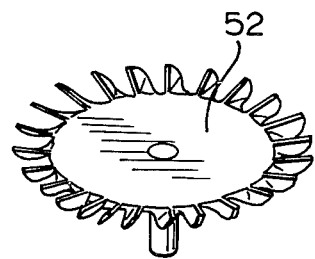

SOLAR ENERGY COLLECTOR

This invention relates generally to solar energy collectors, and has to do particularly with a design for a solar collector in which the energy is collected in water flowing in blackened pipes. The solar energy collector of the present invention is a self-contained unit, intended to be fully functional with or without tracking of the sun's position, and capable of extracting a high percentage of the energy contained in the solar radiation falling upon the unit.

Certain of the conventional solar energy collectors of the water-pipe/reflector type suffer from disadvantages which the present unit attempts to overcome. One of these disadvantages relates to the internal temperature or space within which the water pipes are disposed. In solar collectors of the kind having an enclosed space and including one transparent wall through which the sun's rays pass to reach the blackened pipes containing the water, the temperature of the internal air surrounding the pipes can have a lot to do with the amount of heat which is lost from the pipes by convection and thus heats the internal air. The present invention contains a particular provision aimed at increasing the temperature of the air within the unit, so that the heat transfer is from the air to the pipes rather than the reverse. At the same time, a preferred embodiment of the invention is one which includes sufficient insulating structure that the high temperature of the internally contained air will not bleed away at a significant rate by conduction through the walls.

Another disadvantage of the prior art devices of this kind has to do with the necessity for tracking the sun's position. One of the early concepts for building a solar energy collector consisted of disposing a pipe at the focal point of a curved reflective metal sheet having a crosssection in the shape of a parabola. The parabolic form would thus focus all of the parallel sun's rays onto a single point, actually a line in the extended construction utilized, and the water pipe was disposed along this line. The difficulty with this kind of construction is the absolute necessity for keeping the parabola always with its axis aimed at the sun. Otherwise, the focal point would shift away from the pipe and a large portion of the energy entering the device would not be incident upon the pipe. Subsequent developments also ran into this problem in varying degrees, and where high focal criticality was a characteristic of the device, expensive and continuously-operating tracking means were required. An aspect of the present invention is to do away with the need for continuously-operating tracking means, and to provide a solar energy collector which may be shifted at relatively lengthy intervals, such as 15° at a time, and which under certain circumstances need not be changed in direction at all.

Accordingly, this invention provides a solar energy collector comprising:

a housing including one wall with a reflective inner surface, and a transparent wall opposite said one wall, the housing defining a chamber substantially sealed against air-interchange with the surrounding air, a plurality of parallel, spaced-apart pipes with blackened exteriors, interconnected at their ends to define a fluid path from at least one inlet to at least one outlet, said inlet and outlet extending out of said chamber, the pipes being arranged with respect to each other such that there are a plurality of unhindered light paths through the array of pipes from the transparent wall to the reflective surface, and such that a substantial portion of any light passing along said unhindered paths and reflecting from the reflective surface will strike pipe exteriors, a plurality of surface-darkened metallic plate members inwardly adjacent but spaced from the transparent wall, the plate members being oriented substantially parallel to the adjacent portion of the transparent wall, and light-focusing means forming part of the transparent wall, the light focusing means being situated so as to focus onto the plate members sunlight falling substantially normally upon the transparent wall, whereby the increased energy falling upon the plate members will heat them to a higher temperature than the air in the chamber, thus raising the temperature of the chamber air and by convection adding further heat to the pipes.

Two embodiments of this invention are illustrated in the accompanying drawings, in which like numerals denote like parts throughout the several views, and in which:

FIG. 1 is a perspective view of a solar energy collector constructed in accordance with this invention;

FIG. 2 is a sectional view taken at the line 2—2 in FIG. 1;

FIG. 3 is a sectional view taken at the line 3—3 in FIG. 2;

FIG. 4 is a perspective view, to a larger scale, of one component of the solar collector of this invention.

Figure 5:
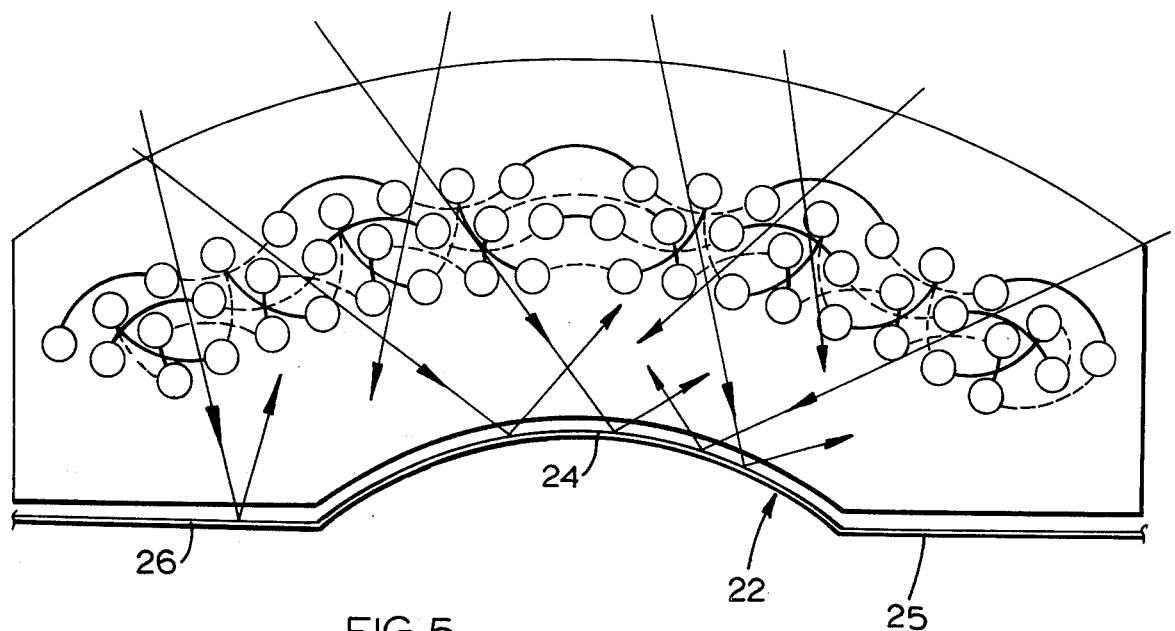
FIG. 5 is a schematic view of the geometric arrangement of the pipes in the solar collector of this invention.

Attention is first directed to FIGS. 1 and 2, in which a solar energy collector generally shown by the numeral 10 consists of a housing 12 which is defined by a number of wall or partition units which will now be described. Forming the base of the housing 12 is a strong metal panel or sheet 13, which may be of sheet steel or the like, and which includes a flat planar portion 14 at the bottom (as seen in FIG. 2) and two upturned marginal portions 15 and 16, disposed at right angles to the flat planar portion 14. The sheet 13 is also upturned at the ends of the housing 12 to define endwise marginal portions 17 (only one visible in FIG. 1). Disposed adjacently within the sheet 13 along the panel 14 and the upturned marginal portions 15, 16 and 17 are layers of insulation material 19, which should preferably be fireproof and which may consist of asbestos-type insulation or fireproof expanded plastic.

Disposed along the bottom or back of the planar panel 14 are channel members 20, provided for the purpose of strengthening the housing 12 and also to provide attachment locations for supporting structure (not shown).

Disposed within the housing 12 and braced against the insulation 19 as a backing is a panel 22 with a reflective inner surface. The panel 22 has a consistent or constant cross-section at all sections taken parallel to that represented by FIG. 2, i.e., taken transverse to the long direction of the housing 12. This particular section can be seen in FIG. 2, and includes a part-cylindrical convex portion 24 extending centrally along the housing wall defined by the panel 14, and further includes planar marginal portions 25 and 26 disposed on either side of the convex portion 24. The planar marginal portions 25 and 26 are shown in broken lines in FIG. 2, as they are hidden by bracket members 28 whose purpose will be subsequently described. Disposed outwardly adjacent each of the planar marginal portions 25 and 26 are two oblique portions 29 and 30, each of which extends upwardly and outwardly at an angle of about 40° with respect to the plane of the marginal portions 25 and 26. Along the outer peripheries of the oblique portions 29 and 30, these are bent into a plane parallel with that of the marginal portions 25 and 26, and repose above the sections of insulation 19 which extend upwardly along the portions 15 and 16. The latter sections of the insulation 19 are, in effect, held in place by the bent peripheral edges of the oblique portions 29 and 30. Attachment means such as bolts, rivets or the like are utilized to make a secure mechanical connection between the marginal portions 25 and 26 of the panel 22 and the panel 14 of the outer sheet 13. The insulation 19 may be glued or otherwise adhered into place.

Extending upwardly from the portions 15 and 16 of the sheet 13 are support panels which are shown in FIG. 2 to be of two types, the panel 32 on the left representing one embodiment of this invention, the panel 33 on the right representing a second embodiment of this invention. The support panel 32 shown on the left in FIG. 2, and representing the first embodiment of this invention, is merely an elongated flat member which is bent inwardly and obliquely at the upper edge to define a location of attachment for a curved transparent panel 34 which is part-cylindrical in the section shown in FIG. 2 and which is substantially concentric with the convex portion 24 of the panel 22. The attachment between the transparent panel 34 and the support panel 32 may be by fasteners, gluing or a combination of these.

The support panel 33 shown at the right in FIG. 2, and forming part of the second embodiment of this invention, is a more complex structure and defines a first step 35 in which the edge of an inner transparent panel 34 can be lodged, and which defines a second step 37 in which the edge of an outer transparent panel 38 can lodge. Suitable fastening means would be provided to secure the edges of the panels 34 and 38 to the support panel 33. The transparent panel 38 is only partly illustrated in FIG. 2, but it would be understood that the second embodiment of this invention would include a complete panel 38 concentric with and spaced from the transparent panel 34 at a constant spacing. A typical spacing would be about 1 inch.

The bracket members 28 already described in connection with FIG. 2 are actually in three pairs at separated intervals along the long dimension of the housing 12. Each pair of bracket members 28 supports a bulkhead 40 which is preferably of transparent material, such as plexiglass or polycarbonate plastic. The configuration of each bulkhead includes a lower concave portion complimentary to the convex portion 24 of the panel 22, two straight bottom edges 42 parallel with the marginal portions 25 and 26, two upright edges 43 at right angles to the straight edges 42, and a curved upper edge 44 complimentary to the inner surface of the transparent panel 34. Each bulkhead 40 has a plurality of circular openings 46 to allow air transfer between the various compartments within the housing 12 defined by the bulkheads 40, although it will be understood that air transfer between the compartments will also take place around the sides of the upright edges 43. Each bulkhead 40 also provides a plurality of smaller circular openings in which a plurality of parallel, spaced-apart pipes are disposed. The pipes have blackened exteriors and are interconnected at their ends to define a fluid path from at least one inlet pipe 48 (FIG. 1) to at least one outlet pipe 50. Valves 50 may be provided on the pipes 48 and 50.

The pipes 47 are arranged with respect to each other such that there are a plurality of unhindered light paths through the array of pipes from the transparent panel 34 to the reflective surface defined by the panel 22, and such that a substantial portion of any light passing along said unhindered paths and reflecting from the reflective surface will strike the exteriors of pipes on the rebound, i.e., from underneath or behind the pipes.

The arrangement of pipes is best illustrated in FIG. 5, to which attention is now directed. The circles disposed in an arcuate array in FIG. 5 represent the individual elongated and parallel pipes disposed in the solar collector of this invention. The linking lines which are solid represent end connections between two pipes at one end of the solar collector, whereas the linking lines which are broken represent end connections at the other end of the solar collector. Straight lines have been drawn showing that it is possible for sunlight to pass along unhindered paths through the array of pipes to reflect from portions of the panel 22, the reflecting ray then impinging upon pipes from underneath, as seen in FIG. 5. Moreover, rays which strike the convex portion 24 of the panel 22 will naturally be reflected in a diverging beam, due to the convexity, and this will further ensure that a number of pipes will lie in the path of the reflected, diverging ray. Naturally, the pipes will also receive direct sunlight impinging on the upper surfaces as seen in FIG. 5, and this will constitute the main energy input for the pipes. However, by allowing sunlight to reach the pipes from underneath upon reflection, a more uniform "light bath" is provided for each pipe, so that energy can be transmitted in through the wall of the pipe from all angles, and not only from the top. If energy reception were confined to the upper surfaces of the pipes, it is possible that these surfaces could become too hot, and that a certain amount of the excess heat would be lost by re-radiation (black body radiation) out through the transparent panel 34 (38).

Attention is now directed to FIGS. 1-4, for a description of a particular provision of this invention, which allows the internal air temperature within the solar collector to be increased beyond what would normally be the case merely with sunlight impinging upon the blackened pipes 47.

Disposed along two arcuate bands 51 located at either end of the solar collector in a position not to cast a shadow upon the pipes 47, are a plurality of metallic plate members 52, which are supported upwardly above the arcuate member 51 on heat-insulated cylinders 54. The plate members 52 are oriented substantially parallel to the adjacent portion of the transparent panel 34, and are preferably of copper, which is not more than 0.04 inches thick. As can be seen particularly in FIG. 4, the periphery of the plate member 52 has been cut into a plurality of blade portions, and these have been angled with respect to the main part of the member 52, whereby an increase in the convective transfer of heat from the member 52 to the chamber air can be effected. The metallic members 52 have their upper surface blackened in order to receive maximum heat from light incident upon them. A plurality of light-focusing means are set into and form part of the transparent panel 34, and are adapted to focus onto the plate members 52 sunlight falling substantially perpendicularly upon the transparent walls at a given location, or falling within a small angle of the perpendicular. The light-focusing means shown especially in FIGS. 2 and 3 consists of a plurality of convex lenses 57 which are surrounded by transparent cylindrical sleeves 58, the latter being affixed to the panel 34. There is one convex lens 57 for each plate member 52.

As can be seen by the focus lens in FIG. 3, (broken lines) the lens 57 will focus sunlight on its corresponding metallic plate member 52 when sunlight falls along the axis of the lens (arrow A), or up to about 25° off the axis (arrow B).

In the second embodiment of the invention, the lenses 57 would preferably be set into the inner transparent panel 34, so that the outer transparent panel 38 would wrap entirely around the outside of the lenses 57.

As can be seen in FIG. 3, a threaded bolt 61 can be provided to secure each metallic plate member 52 to its respective heat-insulative cylinder 54, and a bracket member 62 with appropriate fastening means may be utilized to secure the arcuate support 51 with respect to the adjacent bulkhead 40.

As seen in FIG. 2, bracket extensions 63 are fixed to the adjacent bulkhead 40 and extending outwardly to either side can be utilized to secure into position the extreme ends of the arcuate support panel 51.

It should be pointed out that the canopy represented by the transparent panels 34 and 38 could be made from tempered glass, in order to avoid warping of plastic under excessive overheating. For example, if the solar collector is operated by accident without any water in the pipes 47, it is conceivable that the internal air temperature within the chamber defined by the housing could rise to the melting or warping temperature of thermoplastic materials like clear acrylic.

The panel 22 could either be polished aluminum or stainless steel. It is preferred that the tubing be entirely of copper, due to the high heat-conductivity of this metal.

The metallic plate members 52 which collect heat with the help of the lenses 57 have been given above as not exceeding 0.04 inches in thickness. This limit is not critical, but it is desired to reduce the mass of the members 52 to a minimum, in order not to lose too much time merely heating the mass of metal in the members 52.

The bulkheads 40 may be manufactured of plastic, but could be of any other material, particularly in view of the danger of overheating when the solar collector is improperly operated.

I claim:

1. A solar energy collector comprising:
    a housing including one wall with a reflective inner surface, and a transparent wall opposite said one wall, the housing defining a chamber substantially sealed against air-interchange with the surrounding air,
    a plurality of parallel, spaced-apart pipes with darkened exteriors, interconnected at their ends to define a fluid path from at least one inlet to at least one outlet, said inlet and outlet extending out of said chamber, the pipes being arranged with respect to each other such that there are a plurality of unhindered light paths through the array of pipes from the transparent wall to the reflective surface, and such that a substantial portion of any light passing along said unhindered paths and reflecting from the reflective surface will strike pipe exteriors,
    a plurality of surface-darkened metallic plate members inwardly adjacent but spaced from the transparent wall, the plate members being oriented substantially parallel to the adjacent portion of the transparent wall, and light-focusing means forming part of the transparent wall, the light focusing means being situated so as to focus onto the plate members sunlight falling substantially normally upon the transparent wall, whereby the increased energy falling upon the plate members will heat them to a higher temperature than the air in the chamber, thus raising the temperature of the chamber air and by convection adding further heat to the pipes.

2. The collector claimed in claim 1, in which the reflective surface has a part-cylindrical convex portion extending centrally along said one wall, with planar marginal portions on either side of the convex portion, whereby light reflected from the convex portion will be scattered through an angle due to the convexity.

3. The collector claimed in claim 1, in which the transparent wall is shaped in a convex-outward part-cylindrical configuration, and in which the housing is substantially rectangular with the axis of the said cylindrical configuration being parallel to two of the housing edges.

4. The collector claimed in claim 3, in which the transparent wall is constituted by two transparent sheets spaced from each other and concentrically disposed, to define a gap of uniform transverse dimension between them; and in which the reflective surface has a part-cylindrical convex portion extending centrally along said one wall and parallel to said two housing edges, the convex portion being substantially concentric with said transparent wall, coplanar marginal portions on either side of the convex portion, and oblique portions outwardly of the marginal portions, whereby light reflected from the convex portion will be scattered back divergingly due to the convexity.

5. The collector claimed in claim 1, in which said light-focusing means includes a plurality of convex lenses, one for each plate member; and in which each plate member is a substantially circular, blackened plate of copper.

6. The collector claimed in claim 5 in which each plate member is no more than 0.04 inches thick, to reduce the mass of copper that must be heated, and has marginal blade portions angled with respect to the main part of the member, thereby to increase convective transfer of heat to the chamber air, the plate members being located so as not to throw a shadow on any part of the pipes.

* * * * *